US007826812B1

(12) United States Patent
Lou

(10) Patent No.: US 7,826,812 B1
(45) Date of Patent: **\*Nov. 2, 2010**

(54) DIGITAL CARRIER-RECOVERY SCHEME FOR FM STEREO DETECTION

(75) Inventor: Hui-Ling Lou, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 186 days.

This patent is subject to a terminal disclaimer.

(21) Appl. No.: 12/106,989

(22) Filed: Apr. 21, 2008

Related U.S. Application Data

(63) Continuation of application No. 10/819,454, filed on Apr. 6, 2004, now Pat. No. 7,366,488.

(60) Provisional application No. 60/531,302, filed on Dec. 18, 2003, provisional application No. 60/529,656, filed on Dec. 15, 2003.

(51) Int. Cl.
*H04B 1/16* (2006.01)
*H04B 5/00* (2006.01)

(52) U.S. Cl. .......................... 455/205; 455/337; 381/2

(58) Field of Classification Search ............. 455/227, 455/307, 323, 334, 337, 205, 214, 216; 381/2, 381/3
See application file for complete search history.

(56) References Cited

U.S. PATENT DOCUMENTS 3,294,916 A    12/1966   Elias
4,821,322 A    4/1989    Bose
5,357,544 A    10/1994   Horner et al.
5,357,574 A    10/1994   Whitecar
5,404,405 A    4/1995    Collier et al.
5,442,709 A    8/1995    Vogt et al.
6,694,026 B1   2/2004    Green
7,006,806 B2   2/2006    Wu et al.
7,133,527 B2   11/2006   Kasperkovitz
7,149,312 B1   12/2006   Wildhagen
7,181,018 B1   2/2007    Green
2003/0087618 A1  5/2003  Li et al.
2004/0101143 A1  5/2004  Avalos et al.
2006/0078128 A1  4/2006  Meeusen

OTHER PUBLICATIONS

Faller et al., "Technical Advances in Digital Audio Radio Broadcasting", Proceedings of the IEEE, vol. 90, No. 8, Aug. 2002.
Recommendation ITU-R BS. 450-3, "Transmission Standards for FM Sound Broadcasting at VHF", (1982-1995-2001), The ITU Radiocommunication Assembly.

*Primary Examiner*—Blane J Jackson

(57) ABSTRACT

Systems and techniques for digital processing of FM signals include, in at least one aspect, an FM digital processing method including receiving one or more digital signals including a first signal having a first frequency; obtaining a second signal by multiplying the first signal by X to assist in information recovery from the one or more digital signals based on the first signal; filtering the second signal to obtain a high frequency component of the second signal; delaying the second signal to obtain a delayed signal; and generating an output signal based on the high frequency component of the second signal and a normalization factor derived at least in part from the delayed signal.

30 Claims, 4 Drawing Sheets

US 7,826,812 B1

DIGITAL CARRIER-RECOVERY SCHEME FOR FM STEREO DETECTION

CROSS REFERENCE TO RELATED APPLICATIONS

This application is a continuation application of, and claims the benefit of priority to, U.S. application Ser. No. 10/819,454, filed Apr. 6, 2004 (now issued U.S. Pat. No. 7,366,488); and this application claims the benefit of priority to U.S. Provisional Application Ser. No. 60/529,656, filed Dec. 15, 2003, and U.S. Provisional Application Ser. No. 60/531,302, filed Dec. 18, 2003; and all three related applications are hereby incorporated by reference.

TECHNICAL FIELD

This disclosure relates to digital techniques for FM stereo reception.

BACKGROUND

Public broadcast of radio is an important source of information and entertainment for people all over the world. The transmission of radio programs is based on analog technology, typically using amplitude modulation (AM), frequency modulation (FM), and stereophonic FM (also referred to as FM stereo). In an analog FM system, an analog signal may be encoded into a carrier wave by variation of its instantaneous frequency in accordance with the input analog signal.

FM stereo was introduced to create a more natural listening experience. Rather than a single signal including all of the audio information, stereo transmission involves separate left (L) and right (R) signals. The received and processed L and R signals are sent to different speakers, reproducing (at least partially) the spatial location of the source of a sound.

There are two systems for transmission of FM stereo defined by the International Telecommunications Union (ITU): the stereophonic multiplex signal system and the pilot tone system. In the pilot tone system (according to the ITU standard), suppressed-carrier amplitude modulation is used to modulate stereophonic information onto a higher frequency, and that information can be combined with mono-compatible information in the baseband to form a composite signal that is then frequency modulated to the appropriate program channel. To detect the stereo signal, the carrier that modulates the stereophonic information needs to be recovered.

SUMMARY

Systems and techniques described herein provide for digital processing of FM mono and stereo signals.

In general, in one aspect, a method of FM digital signal processing may include receiving one or more digital signals including a first signal having a first frequency. The method may include obtaining a second signal by multiplying the first signal by X to assist in information recovery from the one or more digital signals based on the first signal. Multiplying the first signal may comprise squaring the first signal. The method may include filtering the second signal to obtain a high frequency component of the second signal; delaying the second signal to obtain a delayed signal; and generating an output signal based on the high frequency component of the second signal and a normalization factor derived at least in part from the delayed signal. The second frequency may be twice the first frequency. In some implementations, the first frequency may be a 19 kHz frequency for a pilot tone, and the second frequency may be a 38 kHz frequency for a carrier signal.

Filtering the second signal may comprise filtering the signal with a filter of order n. Delaying the second signal may comprise delaying the second signal using a delay element having a transfer function of $Z^{-(n/2)}$.

The generating of the output signal may comprise adding the high frequency component of the second signal to the delayed signal to obtain a third signal; inverting the third signal to obtain the normalization factor; and combining the high frequency component of the second signal and the normalization factor to obtain the output signal.

The output signal can be used to obtain a stereophonic signal. The stereophonic signal may be a left and right difference signal. The left and right difference signal can be used to obtain separate left and right signals.

In general, in another aspect, a computer readable medium storing a computer program is operable to cause one or more machines to perform operations comprising multiplying data indicative of a first signal having a first frequency by X to obtain multiplied data, the multiplied data comprising data indicative of a second signal having a second frequency greater than the first frequency. The operations may further comprise filtering the multiplied data to obtain the data indicative of the second signal; generating delayed data by delaying the multiplied data; and generating output data using the data indicative of the second signal and a normalization factor derived at least in part from the delayed data.

In general, in another aspect, a carrier recovery module may comprise a multiplier having an input to receive one or more digital signals including a first signal having a first frequency, the multiplier configured to generate a second signal by multiplying the first signal by X. The module may further comprise a high pass filter, where the second signal is passed through the high pass filter to obtain a high frequency component of the second signal. The module may further comprise a delay element, where the second signal is in communication with the delay element to obtain a delayed signal; and circuitry to generate an output signal based on the high frequency component of the second signal and a normalization factor derived at least in part from the delayed signal.

The circuitry to generate an output signal may comprise a summer, where the summer adds the high frequency component of the second signal to the delayed signal to obtain a third signal; an inverter, where the inverter inverts the third signal to obtain the normalization factor; and a combiner, where the combiner combines the high frequency component of the second signal and the normalization factor to obtain the output signal.

In general, in another aspect, an FM stereo receiver system includes: a filter, the filter having an input to receive one or more digital signals, the filter to pass one or more filtered digital signals; an FM stereo demodulator in communication with the filter, the FM stereo demodulator to recover a mono signal or left and right stereo signals from the one or more filtered digital signals; a carrier recovery module in communication with the FM stereo demodulator, the carrier recovery module comprising: a multiplier, the multiplier having an input to receive one or more digital signals comprising a first signal having a first frequency, the multiplier configured to generate a second signal by multiplying the first signal by X; a high pass filter, wherein the second signal is passed through the high pass filter to obtain a high frequency component of the second signal; a delay element, wherein the second signal is in communication with the delay element to obtain a delayed signal; and circuitry to generate an output signal based on the high frequency component of the second signal and a normalization factor derived at least in part from the delayed signal.

In general, in another aspect, a carrier recovery system may comprise multiplying means for multiplying one or more digital signals including a first signal having a first frequency, the multiplying means thereby generating a second signal. The system may further comprise high pass filtering means in communication with the multiplying means. The system may further comprise delay means in communication with the multiplying means.

In general, in another aspect, a method of FM digital processing may comprise receiving one or more digital signals including a first signal having a first frequency. The method may include obtaining a second signal by multiplying the first signal. The method may further include filtering the second signal to obtain a high frequency component of the second signal. The method may further include generating a first normalization factor based on the second signal at a first time. The method may further include generating a second different normalization factor based on the second signal at a second time different than the first time.

The first time and the second time may be separated by a pre-selected time difference. The first time and the second time may be separated by a time difference determined based on one or more parameters of a radio system comprising a transmitter and a transceiver. The one or more parameters may include a transmitter channel effect of the radio system. The one or more parameters may include a transceiver hardware characteristic.

In general, in another aspect, a computer program may be operable to cause one or more machines to perform operations comprising multiplying data indicative of a first signal having a first frequency to obtain multiplied data, the multiplied data including data indicative of a second signal having a second frequency greater than the first frequency. The operations may further comprise filtering the multiplied data to obtain the data indicative of the second signal. The operations may further comprise generating a first normalization factor based on the data indicative of the second signal at a first time, and generating a second different normalization factor based on the data indicative of the second signal at a second time different than the first time.

In general, in another aspect, a carrier recovery system may comprise a multiplier, the multiplier having an input to receive one or more digital signals including a first signal having a first frequency, multiplier configured to generate a second signal by multiplying the first signal. The system may further comprise a high pass filter in communication with the multiplier, the high pass filter configured to pass a high frequency component of the second signal. The system may further comprise a delay in communication with the multiplier, the delay configured to generate a delayed signal by delaying the second signal. The system may further comprise a summer configured to sum the high frequency component of the second signal and the delayed signal to obtain a time-dependent normalization factor. The system may further comprise an output configured to generate a first output signal by combining the high frequency component of the second signal and a value of the time-dependent normalization factor at a first time. The output may be further configured to generate a second output signal by combining the high frequency component of the second signal and a different value of the time-dependent normalization factor at a second different time.

In general, in another aspect, a carrier recovery system may comprise multiplying means, the multiplying means having an input means for receiving one or more digital signals including a first signal having a first frequency, the multiplying means for generating a second signal by multiplying the first signal. The system may further comprise high pass filtering means in communication with the multiplier, the high pass filtering means for passing a high frequency component of the second signal.

The system may further comprise delay means in communication with the multiplying means, the delay means for generating a delayed signal by delaying the second signal. The system may further comprise summing means for summing the high frequency component of the second signal and the delayed signal to obtain a time-dependent normalization factor. The system may further comprise output means for generating a first output signal by combining the high frequency component of the second signal and a value of the time-dependent normalization factor at a first time, the output means further for generating a second output signal by combining the high frequency component of the second signal and a different value of the time-dependent normalization factor at a second different time.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
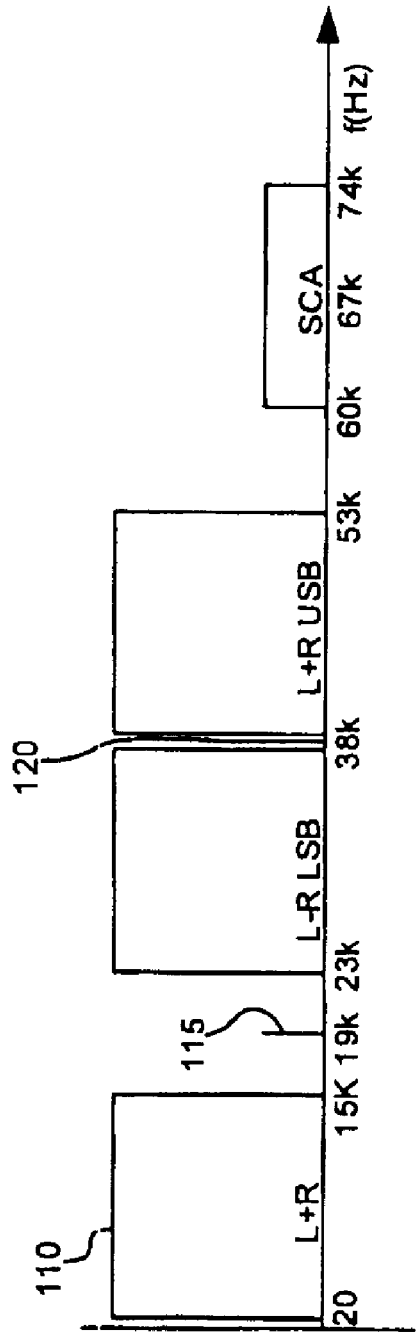
FIG. 1 is a conceptual FM stereo transmission spectrum.

As noted above, a pilot tone FM stereo system uses frequency modulation for a frequency division multiplexed baseband signal having a stereophonic signal and a pilot tone. FIG. 1 shows a conceptual spectrum for FM stereo transmission. According to the ITU specification, a pilot tone system multiplexes the left and right audio signal channels to create a mono-compatible signal that is equal to the sum of the left and right channels (L+R). The mono-compatible signal is transmitted in the baseband 110.

The difference of the left and right channels (referred to as L−R herein; however the R−L may be used) is modulated using suppressed-carrier amplitude modulation with a carrier frequency 120 of 38 kHz. A 19 kHz reference signal, which is referred to as a pilot tone 115, is transmitted as well. Although not discussed herein, there are optional auxiliary data transmission channels such as the Subsidiary Communications Authorization (SCA) channel that are generally transmitted at lower power and higher frequencies (e.g., beyond 53 kHz).

Note also that although the currently used pilot tone and carrier frequencies (19 kHz and 38 kHz, respectively) are discussed herein, the current systems and techniques may be applied for frequencies different than those in current use.

Both the sum and difference signals may be pre-emphasized according to the ITU specification. The L+R, L−R, and the pilot signals form a multiplexed signal that is then frequency modulated to the desired carrier frequency and transmitted. At the receiver, the 38 kHz carrier needs to be recovered using 19 kHz pilot reference signal in order to detect the difference signal.

Figure 2:
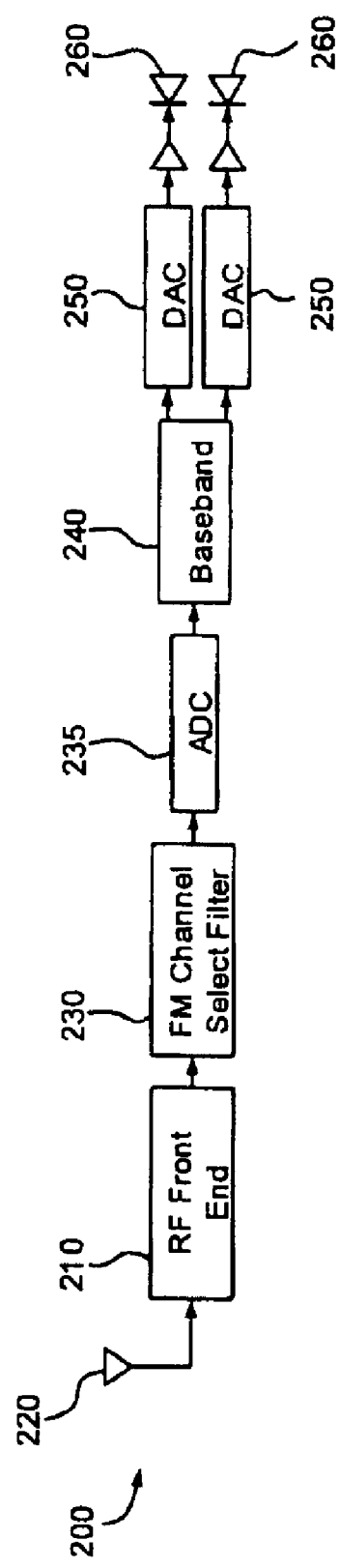
FIG. 2 is a functional block diagram of a digital implementation of an FM stereo receiver.

FIG. 2 shows a functional block diagram of a digital implementation of an FM receiver 200. A radio frequency (RF) analog front-end 210 receives an FM signal from an antenna 220 and transmits an analog signal to an FM channel select filter 230, which filters out the desired program channel. An analog-to-digital converter (ADC) 235 converts the resulting analog signal to a digital signal. Note that the received analog signal may be converted to a digital signal prior to selecting the desired channel, in some implementations.

The digital signal is demodulated using a digital baseband processor 240, described in more detail below. One or more digital to analog converters (DACs) 250 may then be used to transform the left and right channel bitstreams to the analog domain so that they may be played (e.g., the left and right analog signals may be used to drive speakers 260).

Figure 3:
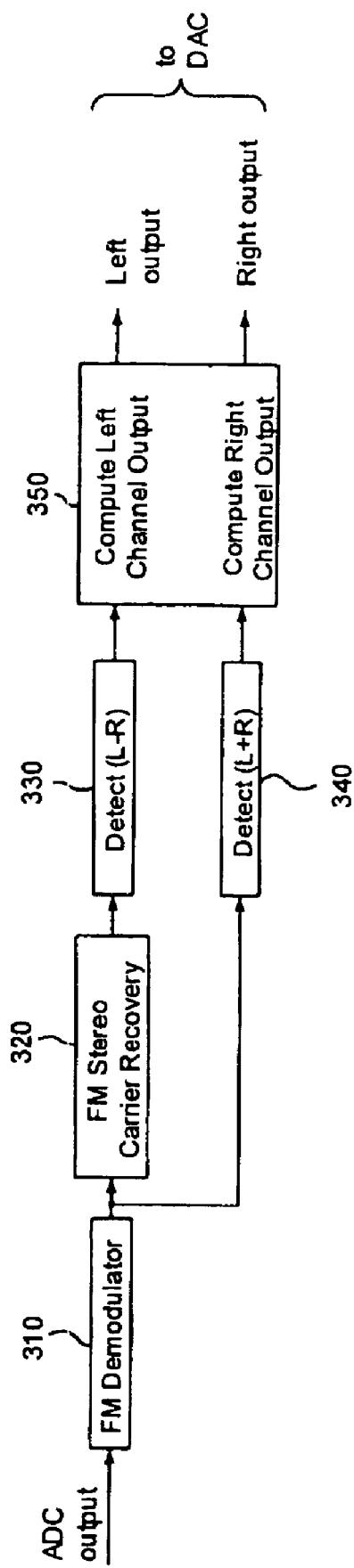
FIG. 3 is a functional block diagram of an implementation of a digital FM stereo baseband processor.

A functional block diagram of an implementation of a digital FM stereo baseband processor such as processor 240 is shown in FIG. 3. An FM demodulator 310 may receive the output bitstream of an ADC such as ADC 235 of FIG. 2. Demodulator 310 extracts the multiplexed L+R, L−R, and the reference pilot tone.

The 38 kHz carrier may be recovered using a carrier recovery module 320. Carrier recovery module 320 uses the pilot tone to recover the 38 kHz carrier in order to detect the L−R bitstream. A detector 330 may implement (for example) bandpass and/or low pass filtering to detect the L−R bitstream.

A detector 340 may implement (for example) low pass filtering to extract the L+R bitstream. Finally, the L+R and L−R bitstreams can be combined appropriately using a combiner 350 to obtain the bitstreams corresponding to the left and right channels. The output of combiner 350 may be provided to one or more DACs, such as DAC 250 of FIG. 2.

Figure 4:
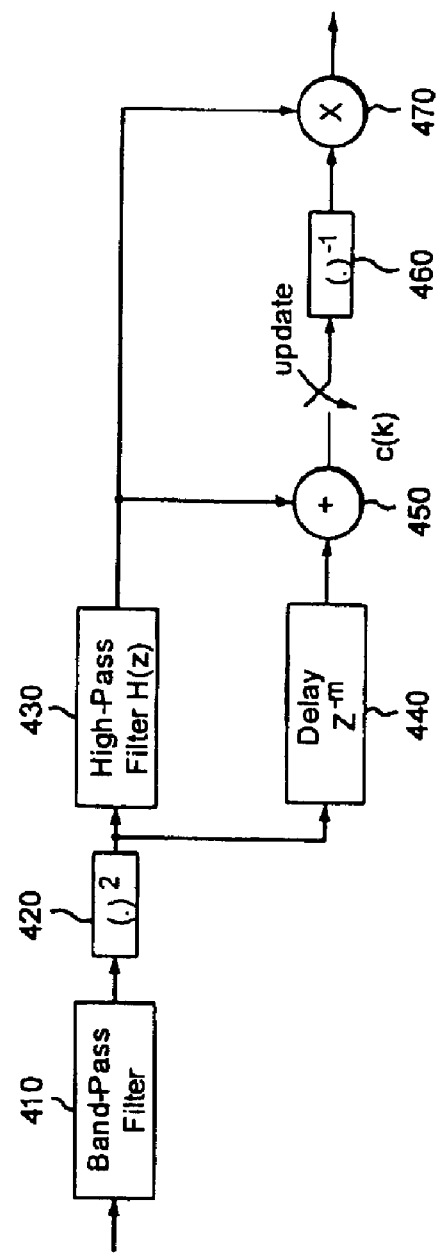
FIG. 4 shows a functional block diagram of an implementation of a carrier recovery module.

FIG. 4 shows an implementation of a carrier recovery module such as carrier recovery module 320 of FIG. 3. A bandpass filter 410 may be used to obtain the 19 kHz pilot tone. A multiplier such as a squaring module 420 may be applied to the filtered signal. The output of squaring module 420 includes both a component at 38 kHz (twice the input signal frequency) and a DC component, as Equation (1) illustrates:

$$\cos^2\alpha = \frac{1}{2}(1 + \cos 2\alpha) \quad \text{Equation (1)}$$

A high pass filter 430 may be used to filter out the carrier signal at 38 kHz. Many possible implementations of high pass filters H(Z) may be used to recover the carrier signal.

Squaring (or other multiplication of) the input signal allows for the recovery of a signal at 38 kHz based on the 19 kHz pilot tone. However, magnitude of the L+R and L−R bitstreams may also need to be normalized by determining a scaling factor for the squared input signal. The bitstreams may need to be normalized because, e.g., the transmitter generally scales the magnitude of the pilot tone to a lower power level than the transmitted audio signal.

Furthermore, transmission channel effects (such as a Doppler effect resulting from a moving transmitter and/or receiver) and the transceiver hardware implementation may cause the scaling factor (which may be denoted as a(t)) to change with time. Squaring the pilot tone with a scaling factor can be represented as shown in Equation (2):

$$a^2(t)\cos^2(2\pi f_p t) = \frac{a^2(t)}{2}(1 + \cos 2\pi(2f_p)t) \quad \text{Equation (2)}$$

where $f_p$=19 kHz. To estimate the sampled scaling factor $$\frac{a^2(t)}{2},$$

denoted as c(k) in FIG. 4, a low-complexity low-pass filter can be implemented using the combination of the high pass filter 430 (denoted as H(Z) in FIG. 4) and a delay element 440 (denoted as $Z^{-m}$ in FIG. 4, where m=n/2 and n is the order of the filter H(Z)).

The output of filter 430 may be subtracted from the output of delay element 440 using a summer 450. The output of summer 450 is c(k), which may then be inverted using an inverter 460. The output of filter 430 can then be multiplied by 1/c(k) to obtain the recovered and normalized 38 kHz carrier, using a multiplier 470.

As noted above, a(t) (or alternatively c(k)) may vary over time. Accordingly, in some implementations, the scaling factor may be determined a single time, while in others it is updated at least once, updated periodically, or updated generally continuously. For example, if a(t) is changing slowly over time, the computation of c(k) may be done occasionally or periodically. However, if a(t) is changing appreciably, it may be advantageous to update a(t) continuously.

Other implementations of a carrier recovery module may be used. For example, depending on the overall FM stereo receiver architecture design, the correction factor may be passed onto the part of a baseband processor where the magnitude of the L+R and L−R bitstreams are normalized. In an example of such an implementation, the L+R bitstream may be multiplied by c(k) in order to avoid the division operations required to compute 1/c(k).

Figure 5:
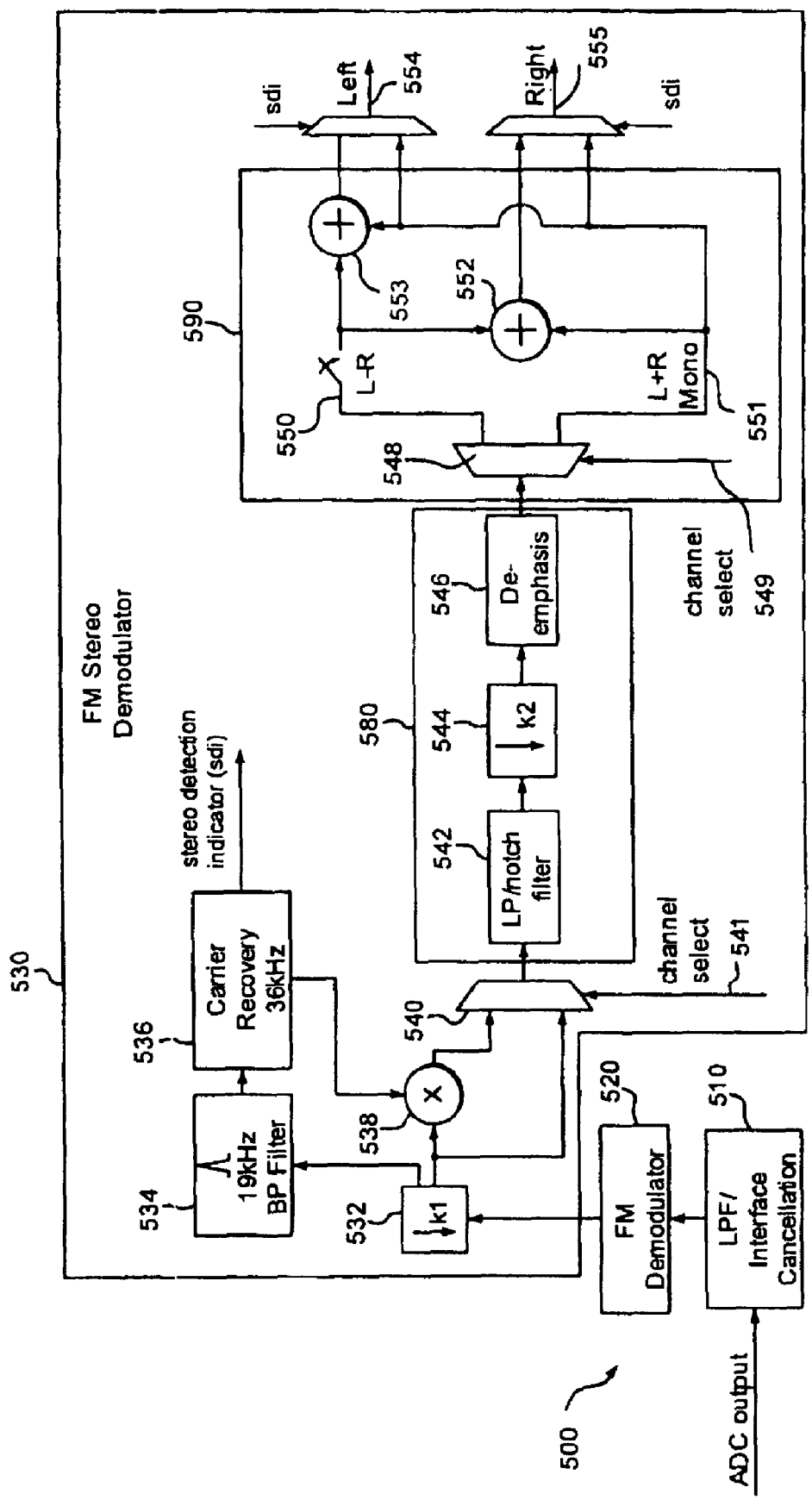
FIG. 5 shows an implementation of an FM stereo receiver system.

Digital FM stereo signal processing may be performed using different receiver architecture implementations. FIG. 5 shows an implementation of an FM stereo receiver system 500. System 500 may receive the output of one or more ADCs such as converter 235 of FIG. 2. A filter 510 may be provided in system 500 for additional channel selection and filtering, to reduce adjacent channel interference.

The output of filter 510 may be provided to a demodulator 520. Demodulator 520 may perform conventional digital FM demodulation. For example, demodulator 520 may obtain the demodulated multiplexed baseband signal by computing the differential of the angle of the complex received signal from the ADC.

The output of demodulator 520 may be provided to an FM stereo demodulator system 530 for recovery of a mono signal (for mono transmission) or left and right signals (for stereo transmission). In some cases, it may be advantageous to down-sample the signal received from the ADC. For example, depending on the particular FM demodulation algorithm and sampling rate used, the signal may be down-sampled by a factor denoted k1 using a down-sampler 532, to reduce the complexity required for subsequent FM stereo demodulation.

In some implementations of system 530, the system may determine if the demodulated signal includes a pilot tone. For example, the demodulated signal may be provided to a bandpass filter 534, and the output of bandpass filter 534 at 19 kHz may be subsequently detected. If the detected magnitude is greater than a threshold magnitude, the system determines that the signal includes a pilot tone and thus detects FM stereo transmission. If the magnitude is less than the threshold magnitude, the system detects mono transmission. A stereo detection indicator (SDI) may be set accordingly, to indicate stereo or mono transmission.

For stereo transmission, a carrier recovery module 536 may recover the 38 kHz carrier so that the L−R bitstream can be down-converted to baseband and subsequently detected. The output from carrier recovery module 536 and from downsampler 532 (or alternately, FM demodulator 520) may be multiplied using a multiplier 538.

The current inventor realized that a stereo receiver architecture with reduced complexity may be provided by using a common processing module for a mono signal and for both L+R and L−R signals. Alternatively, to increase processing speed, more than one processing module may be provided so that at least some of the signals may be processed in parallel.

For example, system 500 may include a processor 580 for processing mono, L−R, and L−R signals. A multiplexer 540 may receive the input from multiplier 538 and from downsampler 532. A channel select input 541 determines whether the L−R bitstream or the L+R bitstream (or mono bitstream, for mono transmission) is processed in processor 580.

For detecting both the mono and L+R transmissions, the FM demodulated bitstream is first passed through a filter 542 which may implement both low pass filtering and notch filtering, where a notch at 19 kHz allows the mono or L+R signal to be extracted while rejecting interference from the pilot tone.

The filtered bitstream may be sub-sampled by a factor of k2 using a sub-sampler 544. The bitstream may then be transmitted to a de-emphasis module 546. De-emphasis module 546 may include a filter denoted by $G(z)$, where $G(z)$ can be derived as shown in Equation (3):

$$G(z) = \frac{1-c}{1-cz^{-1}} \qquad \text{Equation (3)}$$

where $c=e^{1/\tau f}$, and where $\tau$ is typically equal to 50 μsec for Europe or 75 μsec for the United States.

The output of de-emphasis module 546 is input to a multiplexer 548. For mono transmission, a channel select input 549 (which may be based on the stereo detection indicator) sends the input signal of multiplexer 548 to both L output 554 and R output 555 via output 551 of multiplexer 548. For stereo transmission, multiplexer 548 sends the input signal to output 551 to be combined with an L−R signal as described below.

For detection of the L−R signal, the output of multiplexer 540 is the input from multiplier 538. The output of multiplexer 540 may be processed by processor 580 in the same manner as described above for processing the L+R or mono signals. The L−R signal is transmitted by multiplexer 548 on output 550 to be combined with an L+R signal.

The L+R and L−R signals are combined as follows. To obtain the R bitstream, the L−R signal is inverted and added to the L+R signal in a summer 552. To obtain the L bitstream, the L−R and L+R signals are added using a summer 553. The L and R bitstreams may then be output via left output 554 and right output 555, converted to analog signals and used to drive separate speakers (not shown).

Figure 6:
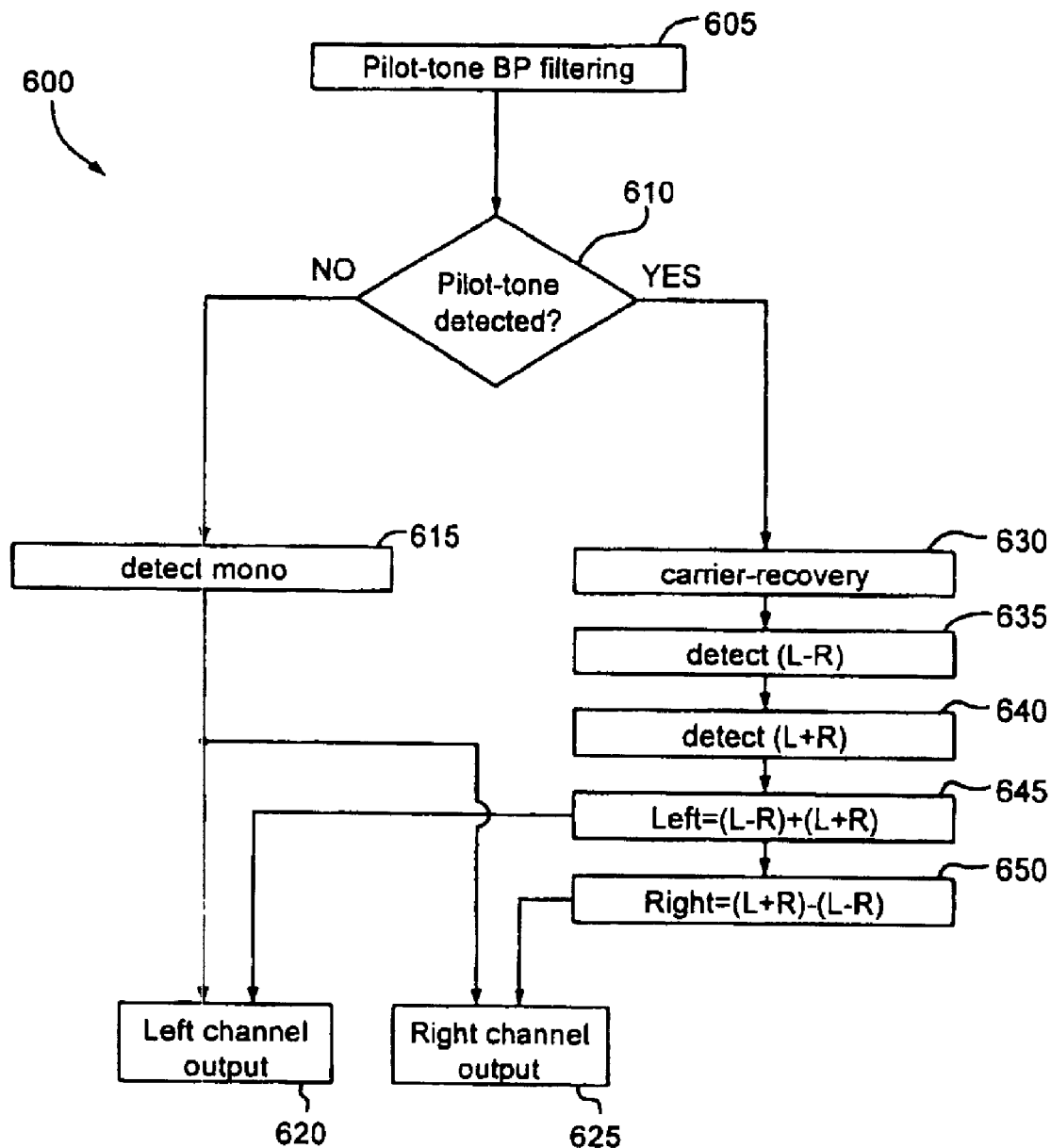
FIG. 6 shows an implementation of a control sequence that may be used with a receiver system such as that shown in FIG. 5.

FIG. 6 is a flow chart illustrating an implementation of a control sequence that may be used with a receiver system such as system 500 of FIG. 5. An input signal may be filtered (605), for example, using a 19 kHz bandpass filter. The output of the filter may be used to detect a pilot tone (610). If a pilot tone is not detected, mono transmission is detected (615). The mono signal is transmitted to both a left channel output (620) and a right channel output (625).

If a pilot tone is detected, carrier recovery may be performed (630). The recovered carrier may be used to detect the L−R bitstream (635). The L+R bitstream may be detected (640). The L+R and L−R bitstreams may be combined to generate a L bitstream (645) that is transmitted to the left channel output (620), as well as to generate a R bitstream (650) that is transmitted to the right channel output (625).

A number of implementations have been described. Nevertheless, it will be understood that various modifications may be made without departing from the spirit and scope of the invention. For example, some functionality described above and illustrated in the figures may be implemented using hardware, using software, or using a combination of hardware and software. Additionally, actions described in a certain order may in some cases be performed in a different order. For example, analog to digital conversion and/or digital to analog conversion may be performed at a different place in the signal processing than described. Accordingly, other implementations are within the scope of the following claims.

What is claimed is:

1. An FM digital processing method comprising:
   receiving one or more digital signals comprising a first signal having a first frequency;
   obtaining a second signal by multiplying the first signal by X to assist in information recovery from the one or more digital signals based on the first signal;
   filtering the second signal to obtain a high frequency component of the second signal;
   delaying the second signal to obtain a delayed signal; and
   generating an output signal based on the high frequency component of the second signal and a normalization factor derived at least in part from the delayed signal.

2. The method of claim 1, wherein X comprises the first signal.

3. The method of claim 1, wherein generating the output signal comprises:
   adding the high frequency component of the second signal to the delayed signal to obtain a third signal;
   inverting the third signal to obtain the normalization factor; and
   combining the high frequency component of the second signal and the normalization factor to obtain the output signal.

4. The method of claim 3, wherein the normalization factor comprises an estimate of a time varying scaling factor applied at a transmitter.

5. The method of claim 4, wherein the normalization factor is computed periodically.

6. The method of claim 1, wherein the first signal is a reference signal, and wherein the high frequency component of the second signal has a second frequency equal to twice the first frequency.

7. The method of claim 1, wherein the first signal is a pilot tone signal.

8. The method of claim 1, wherein:
filtering the second signal to obtain a high frequency component of the second signal comprises a filter of order n; and
delaying the second signal to obtain a delayed signal comprises delaying the second signal using a delay element having a transfer function $Z^{-(n/2)}$.

9. The method of claim 1, wherein:
the output signal is used to obtain a stereophonic signal;
the stereophonic signal comprises a left and right difference signal; and
the left and right difference signal is used to obtain separate left and right signals.

10. A computer readable medium storing a computer program operable to cause one or more machines to perform operations comprising:
multiplying data indicative of a first signal having a first frequency by X to obtain multiplied data, the multiplied data comprising data indicative of a second signal having a second frequency greater than the first frequency;
filtering the multiplied data to obtain the data indicative of the second signal;
generating delayed data by delaying the multiplied data; and
generating output data using the data indicative of the second signal and a normalization factor derived at least in part from the delayed data.

11. The computer readable medium of claim 10, wherein X comprises the data indicative of the first signal.

12. The computer readable medium of claim 10, wherein generating output data comprises:
adding the data indicative of the second signal to the delayed data to obtain data indicative of a third signal;
inverting the data indicative of the third signal to obtain the normalization factor; and
combining the data indicative of the second signal and the normalization factor to obtain the output data.

13. The computer readable medium of claim 12, wherein the normalization factor comprises an estimate of a time varying scaling factor applied at a transmitter.

14. The computer readable medium of claim 13, wherein the normalization factor is computed periodically.

15. The computer readable medium of claim 10, wherein:
the data indicative of the first signal is data indicative of a reference signal; and
the data indicative of the second signal has a second frequency equal to twice the first frequency.

16. The computer readable medium of claim 10, wherein the data indicative of the first signal is data indicative of a pilot tone signal.

17. The computer readable medium of claim 10, wherein:
filtering the multiplied data to obtain the data indicative of the second signal comprises a filter of order n; and
generating the delayed data by delaying the multiplied data comprises using a delay element having a transfer function $Z^{-(n/2)}$.

18. The computer readable medium of claim 10, wherein:
the output data is used to obtain data indicative of a stereophonic signal;
the data indicative of the stereophonic signal comprises data indicative of a left and right difference signal; and
the data indicative of the left and right difference signal is used to obtain data indicative of separate left and right signals.

19. A carrier recovery module comprising:
a multiplier, the multiplier having an input to receive one or more digital signals comprising a first signal having a first frequency, the multiplier configured to generate a second signal by multiplying the first signal by X;
a high pass filter, wherein the second signal is passed through the high pass filter to obtain a high frequency component of the second signal;
a delay element, wherein the second signal is in communication with the delay element to obtain a delayed signal; and
circuitry to generate an output signal based on the high frequency component of the second signal and a normalization factor derived at least in part from the delayed signal.

20. The carrier recovery module of claim 19, wherein X comprises the first signal.

21. The carrier recovery module of claim 19, wherein the circuitry to generate an output signal comprises:
a summer, wherein the summer adds the high frequency component of the second signal to the delayed signal to obtain a third signal;
an inverter, wherein the inverter inverts the third signal to obtain the normalization factor; and
a combiner, wherein the combiner combines the high frequency component of the second signal and the normalization factor to obtain the output signal.

22. The carrier recovery module of claim 19, wherein the first signal is a reference signal, and wherein the high frequency component of the second signal has a second frequency equal to twice the first frequency.

23. The carrier recovery module of claim 19, wherein:
the high pass filter is of order n; and
the delay element has a transfer function $Z^{-(n/2)}$.

24. The carrier recovery module of claim 19, wherein:
the output signal is used to obtain a stereophonic signal;
the stereophonic signal comprises a left and right difference signal; and
the left and right difference signal is used to obtain separate left and right signals.

25. An FM stereo receiver system comprising:
a filter, the filter having an input to receive one or more digital signals, the filter to pass one or more filtered digital signals;
an FM stereo demodulator in communication with the filter, the FM stereo demodulator to recover a mono signal or left and right stereo signals from the one or more filtered digital signals;
a carrier recovery module in communication with the FM stereo demodulator, the carrier recovery module comprising:
a multiplier, the multiplier having an input to receive one or more digital signals comprising a first signal having a first frequency, the multiplier configured to generate a second signal by multiplying the first signal by X;
a high pass filter, wherein the second signal is passed through the high pass filter to obtain a high frequency component of the second signal;
a delay element, wherein the second signal is in communication with the delay element to obtain a delayed signal; and
circuitry to generate an output signal based on the high frequency component of the second signal and a normalization factor derived at least in part from the delayed signal.

26. The system of claim 25, wherein X comprises the first signal.

27. The system of claim 25, wherein the circuitry to generate an output signal comprises:

a summer, wherein the summer adds the high frequency component of the second signal to the delayed signal to obtain a third signal;

an inverter, wherein the inverter inverts the third signal to obtain the normalization factor; and a combiner, wherein the combiner combines the high frequency component of the second signal and the normalization factor to obtain the output signal.

28. The system of claim 25, wherein the first signal is a reference signal, and wherein the high frequency component of the second signal has a second frequency equal to twice the first frequency.

29. The system of claim 25, wherein:

the high pass filter is of order n; and the delay element has a transfer function $Z^{-(n/2)}$.

30. The system of claim 25, wherein:

the output signal is used to obtain a stereophonic signal;

the stereophonic signal comprises a left and right difference signal; and the left and right difference signal is used to obtain separate left and right signals.

* * * * *